(12) United States Patent
Matsunaga et al.

(10) Patent No.: US 7,193,740 B2
(45) Date of Patent: Mar. 20, 2007

(54) PRINT DATA TRANSFER METHOD, PRINTING SYSTEM, PRINTER DEVICE AND PRINT CONTROL PROGRAM

(75) Inventors: Shigeki Matsunaga, Kadoma (JP); Takahiko Nankou, Sanda (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 1023 days.

(21) Appl. No.: 10/345,928

(22) Filed: Jan. 17, 2003

(65) Prior Publication Data
US 2003/0142349 A1    Jul. 31, 2003

(30) Foreign Application Priority Data
Jan. 31, 2002 (JP) ............................. 2002-024578
Mar. 4, 2002 (JP) ............................. 2002-057995

(51) Int. Cl.
*G06F 3/12* (2006.01)
*G06K 15/00* (2006.01)

(52) U.S. Cl. ..................... 358/1.15; 358/1.14

(58) Field of Classification Search ......... 358/1.1–1.18
See application file for complete search history.

(56) References Cited

U.S. PATENT DOCUMENTS 6,166,826 A * 12/2000 Yokoyama ................. 358/1.16

FOREIGN PATENT DOCUMENTS

JP         2001096853 A  *  4/2001

* cited by examiner

*Primary Examiner*—Douglas Q. Tran
(74) *Attorney, Agent, or Firm*—Wenderoth, Lind & Ponack, L.L.P.

(57) ABSTRACT

An HDD unit (12) holds a print object. A controller (11) issues to a printer unit (13) a print command of acquiring and printing the print object stored in the HDD unit (12), and has the printer unit (13) receive data in which link path information to a file to be printed is described via a connection established between the HDD unit (12) and the printer unit (13). The printer unit (13) captures and prints the print object stored in the HDD unit (12) by requesting the HDD unit (12) to send the print object which is uniquely specified with the link path information, using attribute information which is obtained by inquiring the connection status.

49 Claims, 16 Drawing Sheets

Fig. 5

| CAPTURE command frame | |
|---|---|
| subfunction | (1) |
| status | (1) |
| result | (1) |
| destination_plug | (1) |
| print_job_ID | (12) |
| image_format_specifier | (2) |
| data_size | (4) |
| image_size_x | (2) |
| image_size_y | (2) |
| next_pic | (2) |
| next_page | (2) |

Fig. 15

```
<Link path information>
<URL>http://www.panasonic.co.jp/products/tv/index.html</URL>
<Relative path reference location>
    http://www.panasonic.co.jp/products/tv/
</Relative path reference location>
<Format>
    XHTML-Print
</Format>
<Print parameter>
    <Two-sided print>On</Two-sided print>
    <Paper size>A4</Paper size>
    <Paper type>high quality paper</Paper type>
    <Print resolution>720dpi</Print resolution>
        . . . .
</Print parameter>
</Link path information>
```

Fig. 16

| field | STATUS command frame | STABLE response frame |
|---|---|---|
| subfunction | $FF_{16}$ | ← |
| status | $FF_{16}$ | current value |
| plug ID | specified plug ID | ← |
| plug Offset | $3FFFFFFFF_{16}$ | current value |
| port ID | specified port ID | ← |
| port bits | $11_2$ | current value |
| connected node ID | $FFFF_{16}$ | current value |
| connected plug offset | $3FFFFFFFF_{16}$ | current value |
| connected port ID | $F_{16}$ | current value |
| connected port bits | $11_2$ | current value |
| connected plug ID | $FF_{16}$ | current value |
| ex | $1_2$ | current value |
| connected count | $3F_{16}$ | current value |
| write interval | $F_{16}$ | current value |
| retry count | $F_{16}$ | current value |
| segment_type | $FF_{16}$ | current value |
| subunit_type | $1E_{16}$ | current value |
| subunit_ID | $5_{16}$ | current value |
| subunit_plug | $FE_{16}$ | current value |

"←" means "same as the command frame"

PRINT DATA TRANSFER METHOD, PRINTING SYSTEM, PRINTER DEVICE AND PRINT CONTROL PROGRAM

BACKGROUND OF THE INVENTION (1) Field of the Invention

The present invention relates to a method for transferring print data to a printer device, and particularly to a pull-type print mode in which the printer device requests a supplier of print data to supply the print data.

(2) Description of the Prior Art

An attempt has been made to connect a printer device to AV (Audio Visual) devices such as a digital camera and a digital broadcast receiver (STB: Set Top Box) and to print video taken and received by the AV devices directly in the printer device. However, the AV devices such as STB, being different from a personal computer, are not generally equipped with an auxiliary mass storage device such as a hard disk drive and a CD-ROM drive, and the devices that have the function to update their own firmware are few in number. Therefore, it is desirable to avoid installing different driver software for each model of the printer device to be connected. Consequently, a flexible connection mode is desirable, in which it is possible to connect freely-selected AV devices and the printer device and print without installing the device-specific software if the device conforms to a specific standard.

As a measure to respond to this demand, there is AV/C Digital Interface Command Set (AV/C Protocol) defined by the 1394 Trade Association (TA). AV/C Protocol decides the minimum standard protocol for the connection of AV devices, maintains compatibility between the AV devices, and provides a framework in which each maker can individually improve the performance of the devices. Moreover, out of AV/C Protocol, there is AV/C Printer Subunit that defines AV/C commands particularly relating to the printer device. As to the details of the AV/C Printer Subunit, see "TA Document 1999038 AV/C Printer Subunit Specification 1.0" which is available at "http://www.1394TA.org".

FIG. 1 is a sequence diagram that shows an example of communication procedure when an AV device such as a digital camera outputs an image for printing in the printer device following existing AV/C Printer Subunit. Here, FIG. 1 shows communication sequence when a controller 900 connected by an IEEE1394 bus outputs a print object such as an image held inside the controller 900 to a printer unit (printer device) 910, and the commands and responses at that time.

For a start, after the controller 900 acquires version information from the printer unit 910, creates a print job specified with a job identifier "job_ID" in the printer unit 910, and then establishes a logical transfer channel (asynchronous data transfer connection; Asynchronous Connection).

Then, the controller 900 specifies the print object that the controller 900 wants to output by sending an AV/C command CAPTURE to the printer unit 910, and the controller 900 outputs (pushes) the specified print object to the printer unit 910 through the transfer channel.

After the printing has completed and the printer unit 910 returns the completion status ACCEPTED response to the controller 900, which disconnects the transfer channel Asynchronous Connection and polls the job status in the printer unit 910 after closing the print job.

By this means, the output of the print object from the AV device to the printer device according to AV/C Printer Subunit enables the printer device to print the print object without installing individual driver software.

However, the print command CAPTURE in above-mentioned AV/C Printer Subunit is issued based on the push-type print mode (Push Print) in which after issuing that print command, the controller outputs the print object held by the controller itself to the printer device, and is not applicable to the pull-type print mode (Pull Print) in which the printer device itself captures a necessary print object from a necessary location (i.e., executes printing based on the data acquisition request from the printer device).

Therefore, as for the print object consisting of a plurality of files which are linked to each other, such as a print object described by HTML (Hyper Text Markup Language), the printer device requires a mass storage buffer for storing the print object for 1 page due to the need of transferring the print object per page. That is a problem.

There is another problem that the processing load on the controller is heavy because it needs to control the output of the print object to the printer device so as to output it depending upon the printing progress in the printer device under its monitoring.

There is still another problem. Since the controller is based on the system configuration that the controller outputs the print object held by the controller itself to the printer device, it is difficult for the controller to perform print processing in compliance with different system configurations other than the basic configuration, in which the controller has the print object stored in another location than the controller (an independent print object supply device) printed.

Problems specific to the IEEE1394 standard are as follows. A printing technology using AV/C Printer Subunit defined by IEEE1394 has been proposed, but it supports only the push-type print mode for printing the image data, in which the print object supply device transfers the print object to the printer device. Therefore, in order to print the data described in a link file format like HTML, there is no other method but transferring the data after generating in advance one image data in the print object supply device, which requires a lot of processing capabilities and memory resources of the print object supply device.

On the other hand, a pull-type print mode using an XHTML-Print format has been proposed as a technique used for Bluetooth and so on. According to this technique, the printer device can request the print object supply device to send a linked print object from whenever necessary while analyzing link path lo information that uniquely specifies the location of the file of the print object, which can reduce the load on the printer device and the print object supply device. However, this technique has a disadvantage that it is difficult to introduce this technique into IEEE1394 for the existing AV/C Printer Subunit alone due to a difference of design concept.

Meanwhile, there is an approach of extending the existing AV/C Printer Subunit by adding a new AV/C command so as to realize the pull-type print mode. However, this is a problem that such an approach causes a modification of the well-known protocol, which confuses engineers in the area of IEEE1394.

SUMMARY OF THE INVENTION

The present invention has been devised in view of these circumstances, and it is an object of the present invention to provide a printing system and others that make effective use of the capabilities of a pull-type printer device.

It is another object of the present invention to provide a printing system and others that enable printing of a print object even if the print object is located in a place (a print object supply device) different from a print control device that issues a print instruction.

It is still another object of the present invention to provide a printing system and others that prevent the print object on the print object supply device from being accessed without permission through a device irrelevant to print processing.

Specifically speaking from the viewpoint of IEEE1394, it is further another object of the present invention to make it possible to realize a pull-type print mode using the framework of the existing AV/C Protocol such as AV/C Printer Subunit.

In order to achieve aforesaid objects, the print data transfer method according to the present invention is a method for transferring a print object to a printer device (an image forming device), wherein the printer device receives data in which link path information to a file to be printed is described in an XHTML-Print format or the like via a connection established between the print object supply device and the printer device, the printer device issues is a send request of the file which can be uniquely specified with the link path information described in the received data to the print object supply device which is connected to the printer device via the connection, and the printer device receives the requested file via the connection.

The data in which the link path information is described is the print data itself, and the file which can be uniquely specified with the link path information may be a part of the final printing.

More specifically, according to IEEE1394, when receiving a print instruction of the data in which the link path information is described, the printer device issues, based on the AV/C command of the existing AV/C Printer Subunit, an AV/C command for sending data to the print object supply device in order to capture the data such as JPEG, PNG and text whose link is indicated in the link path information, and receives that data via the established connection.

Parameters for command issuance are required for issuance of the AV/C command for sending the data. The print data transfer method according to the present invention is characterized in that these parameters are obtained by inquiring the status of the established connection.

Here, after receiving all the print data necessary for printing from the print object supply device and requiring no print data stored in the print object supply device due to completion of the printing, the printer device may send a response to the print instruction of the data in which the link path information is described. Thereby, the timing of deleting the print data in the print object supply device is found.

Also, when a bus reset occurs on the connection (bus) to which the printer device is connected, the printer device may resume the operation in response to the print instruction after completing (1) restoration of the connection between the print object supply device and the printer device and (2) restoration of the AV/C command CAPTURE (AV/C command of AV/C Printer Subunit) that is a print instruction of instructing the printer device to receive the data in which the link path information is described. Thereby, confusion associated with resumption of the print processing can be prevented.

The send command issuance parameters that the printer device issues to the print object supply device may be the address information that is the destination of the command issuance, the type information for issuing the send command according to the procedure depending on the type of the print object supply device, other parameters, or a combination of them.

The address information may be "Node_ID" or "EUI_64" in the IEEE1394 standard, or a combination of "Node_ID" or "EUI_64" and "Subunit_type" and "Subunit_ID" in the IEEE1394 standard.

Also, the type information may be "Subunit_Type" in the IEEE1394 standard.

When the print object captured from the print object supply device includes the link information indicating the reference to other print object, the printer device may capture the reference print object indicated by the link information and print the captured print object by requesting the print object supply device to send the reference print object at the timing of printing the reference print object.

The print control device (controller) that controls print processing, the print object supply device that supplies print data and the printer device that forms a print image may exist as respectively independent devices. Or arbitrary devices may be integrated as one unit, like STB with built-in HDD (hard disk) where the print control device (controller) and the print object supply device exist in the same AV device, for instance.

Furthermore, the print object supply device according to the present invention is characterized in that it has mechanisms for preventing access without permission by devices irrelevant to print processing. Specifically speaking, the print object supply device according to the present invention has any one of the following three mechanisms or an arbitrary combination of them: in response to the request inquiring the type of the device (capability), (1) a mechanism for not replying possession of the print object supply capability; (2) a mechanism for rejecting all the requests from other devices than the predetermined device; and (3) a mechanism for supplying print objects in response only to the request by a special means.

The present invention can be realized not only as the printing system like this, but also as respectively discrete devices, that is, the print control device, the print object supply device and the printer device which are included in this printing system, a printing method including steps of characteristic operations in this printing system, or a program that causes a general purpose computer such as a personal computer to execute the characteristic operations to function them. The program can, of course, be distributed via a computer readable recording medium such as CD-ROM or a transmission medium such as the Internet.

The printing system according to the present invention is a system including a print object supply device, a print control device and an image forming device that are connected to each other via a transmission channel, wherein a printer device receives the data in which link path information to a file to be printed is described via a connection established between the print object supply device and the printer device, requests the print object supply device to send a print object that is uniquely specified with the link path information, using attribute information that the printer device obtains by inquiring the connection status when necessary, and thereby receives the requested print object from the print object supply device via the connection. The pull-type print mode can be realized in which the printer device itself captures a necessary print object from a necessary location.

Accordingly, when printing the data described in a link file format like HTML, the printing system can be released from a constraint that the print object supply device generates one image data in advance and then transfers the data. Therefore, the problem that the print object supply device requires a large amount of memory and processing capability can be solved.

Also, since the controller does not need control the output of the print object so as to output it depending upon the printing progress in the printer device under the monitoring, the processing load on the controller can be reduced.

Furthermore, since the controller establishes a connection for transferring print objects between an independent print object supply device and printer that are in a different location from the controller itself, the print objects stored in other locations than the controller can be printed. In sum, flexible printing can be realized depending upon a variety of system configurations.

In addition, since the pull-type print mode can be realized by the command CAPTURE of AV/C Printer Subunit in the existing IEEE1394, the problem that the protocol change for realizing the pull-type print mode confuses engineers in the IEEE1394 area can be solved.

The printer device may obtain type information indicating the type of the print object supply device by inquiring the status of the established connection and capture the print object stored in the print object supply device according to the procedure suitable for the obtained type information.

Accordingly, when the command system and the order on sending and receiving information depend on the type of the print object supply device, the image forming device can capture the print object according to the protocol suitable for the characteristics of is the print object supply device with the understanding of the differences in the command system and the order of information, and therefore the efficiency of the transfer and printing processing of the print object can be improved.

Furthermore, since the access to the print object in the print object supply device is limited only to the printer device selected by the user or the controller as a print unit, the print processing can be secured and the copyright of the print object can be protected.

As described above, the present invention contributes improvement of flexibility in printing in the system where a plurality of home-use AV devices are connected by an IEEE1394 bus or the like. Therefore, the practical value of the present invention is extremely high.

FURTHER INFORMATION ABOUT TECHNICAL BACKGROUND TO THIS APPLICATION

The following applications are incorporated herein by reference:

Japanese Patent Application No. 2002-024578 filed Jan. 31, 2002;

Japanese Patent Application No. 2002-057995 filed Mar. 4, 2002.

BRIEF DESCRIPTION OF THE DRAWINGS

These and other objects, advantages and features of the invention will become apparent from the following description thereof taken in conjunction with the accompanying drawings that illustrate a specific embodiment of the invention. In the Drawings:

FIG. 5 is a diagram showing parameters of a print instruction command "CAPTURE" of the existing IEEE1394 AV/C Printer Subunit.

FIG. 15 is a diagram showing an illustrative example of a print main object on which link path information is described.

FIG. 16 is a diagram showing parameters of IEEE1394 AV/C AC Manage STATUS command for inquiring connection status.

DESCRIPTION OF THE PREFERRED EMBODIMENT(S)

The present embodiment of the present invention will be explained below with reference to drawings.

Figure 2:
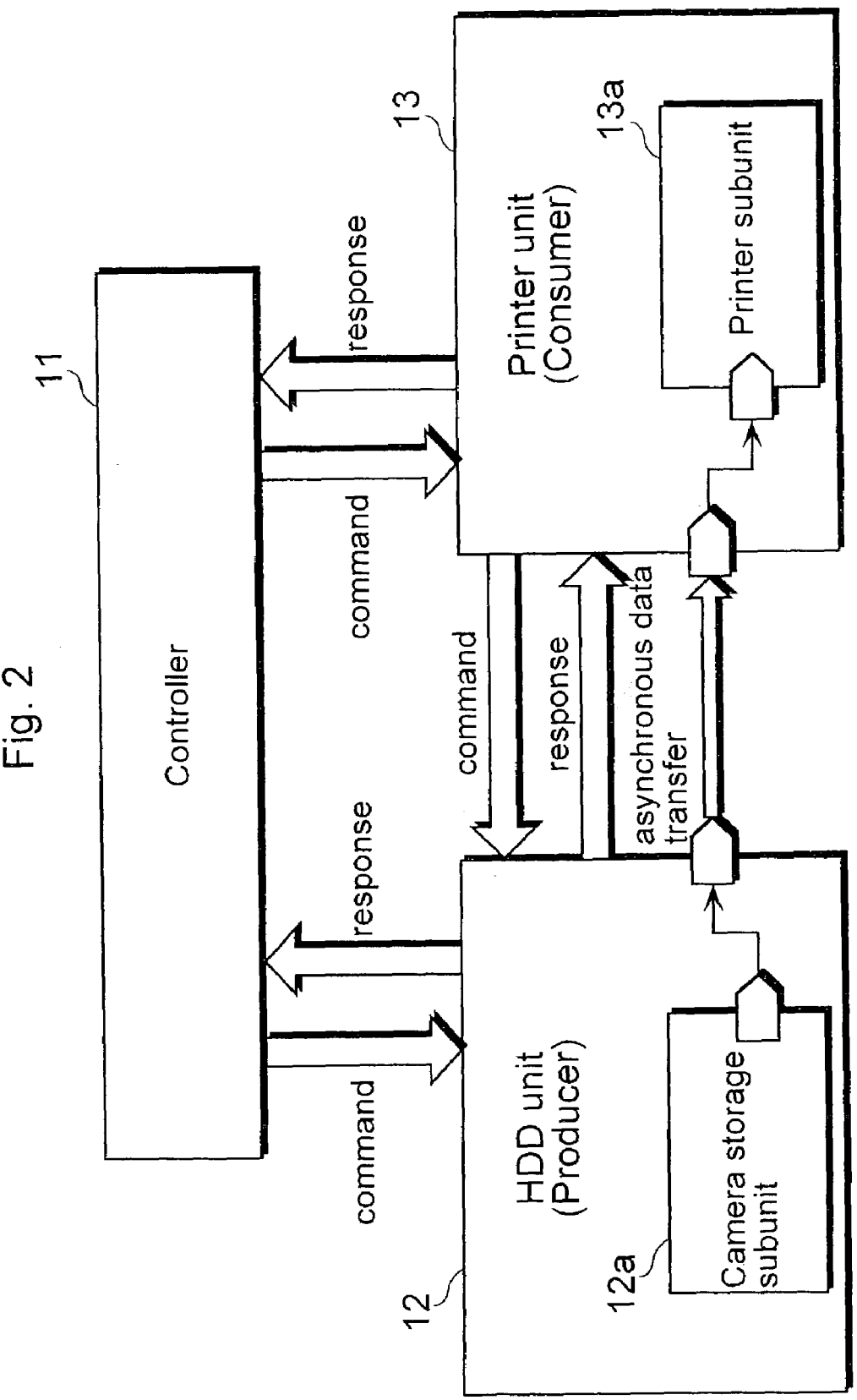
FIG. 2 is a diagram showing a system model of a printing system according to the embodiment of the present invention.

FIG. 2 is a diagram that shows a system model of a printing system according to the present embodiment. This system model is made up of a controller 11, an HDD unit 12 and a printer unit 13 which are connected to each other by an IEEE1394 bus. The basic structure of the system model is same as that of the conventional system model defined by IEEE1394 AV/C Printer Subunit, but the present system model is characterized in that a peculiar operation to a pull-type printer device (command sequences between the HDD unit 12 and the printer unit 13) is added.

The controller 11 is a device such as STB equipped with a connection management function on the IEEE1394 bus. The HDD unit 12 is a hard disk drive or the like, which corresponds to a data supply device (Producer) on a bus, and has in itself a camera storage subunit 12a that holds transmission data. The printer unit 13 is a printer device or the like, which corresponds to a data reception device (Consumer) on the bus, and has in itself a printer subunit 13a that prints received data.

Each unit corresponds to an AV device as hardware, while a subunit corresponds to what controls the functions of the AV device (a virtual function unit). A combination of the subunits becomes a unit, and the function units to be included in the unit are decided as necessary. Additionally, the subunit is a virtual function unit and does not necessarily agree with the hardware structure.

The feature in FIG. 2 is, as is shown in the exchange of data (command and response) between the HDD unit 12 and the printer unit 13, that not only the controller 11 or the like pushes the print object to the printer unit 13 for printing but also the printer unit 13 can pull the print object from the HDD unit 12 to print it. Note that the print object is transmitted through an asynchronous data transfer connection (Asynchronous Connection) that has been already established. When the present embodiment is explained as a controller-subunit model according to the IEEE1394 AV/C standard, the controller 11 is a controller for the printer subunit 13a in the printer unit 13. Additionally, when the HDD unit 12 pushes the print object to the printer unit 13 for printing, the controller 11 becomes a controller for the camera storage subunit 12a in the HDD unit 12. Furthermore, when the printer unit 13 pulls the print object from the HDD unit 12, the printer unit 13 becomes a controller for the camera storage subunit 12a in the HDD unit 12. In this case, the printer subunit 13a itself may function as a controller, or a module other than the printer subunit 13a may fulfill the role of the controller internally.

Figure 1:
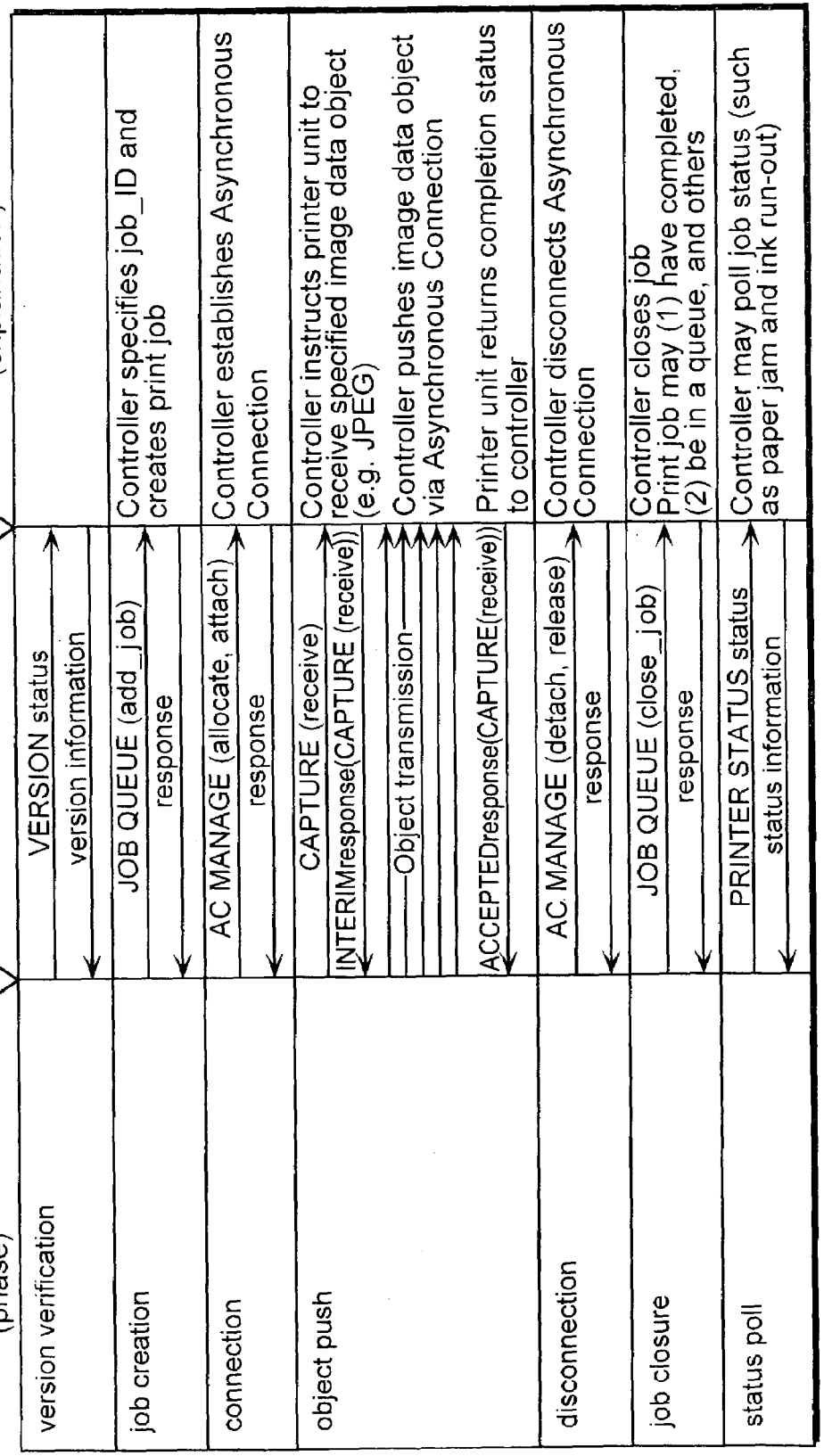
FIG. 1 is a communication sequence diagram showing the conventional printing procedure.
Figure 3:
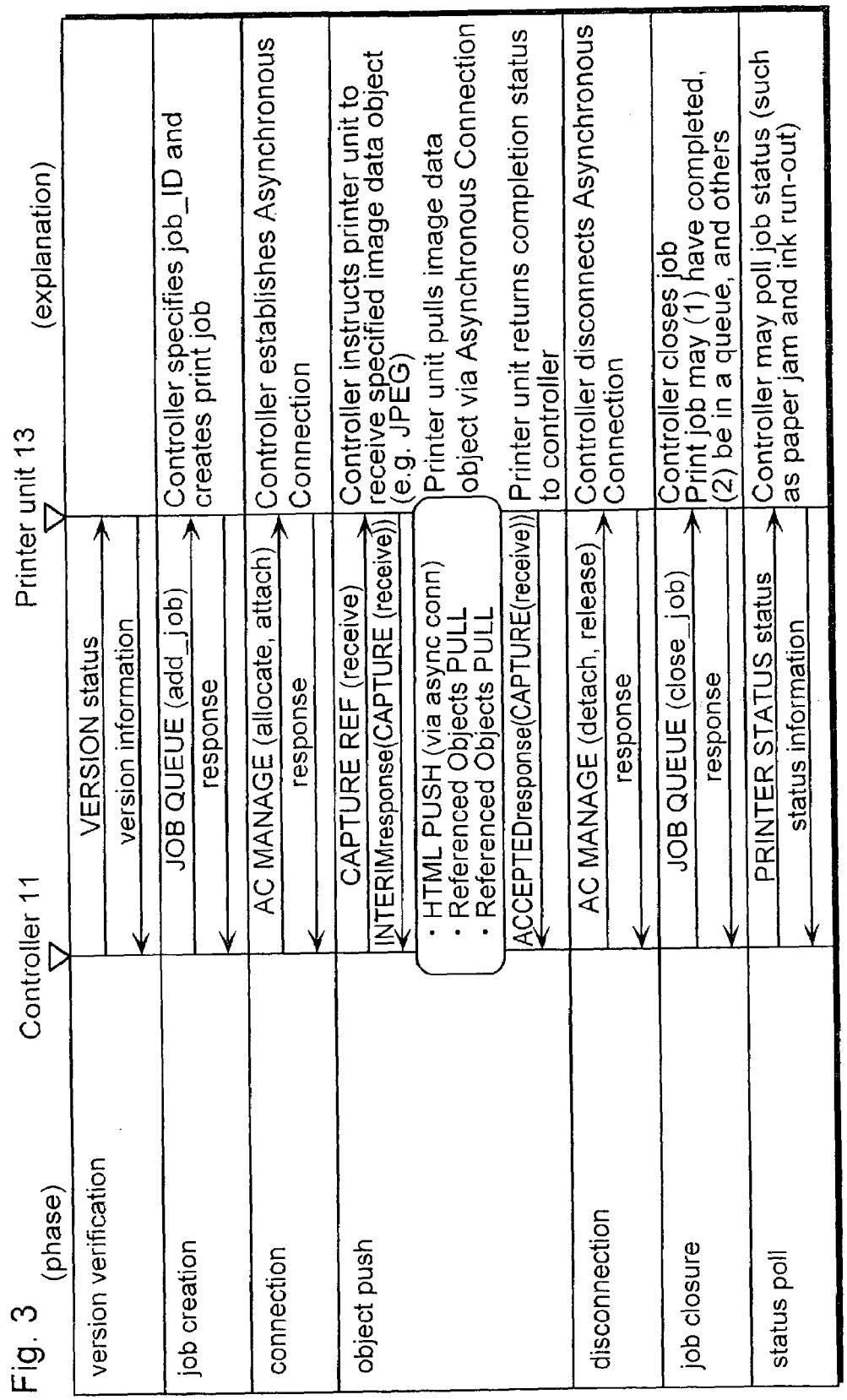
FIG. 3 is a diagram showing a communication sequence in the system model shown in FIG. 2.

FIG. 3 is a diagram that shows communication sequence in the system model shown in FIG. 2, and corresponds to FIG. 1 of the prior art. The present embodiment has two different points from the prior art shown in FIG. 1. The first one is the value of the parameter "image_format_specifier" for the command CAPTURE (AV/C Printer Subunit). In the command CAPTURE used in the sequence of the prior art in FIG. 1, a format suitable for push-type print mode such as JPEG ("0x100F") is specified as the parameter "image_format_specifier" (FIG. 5) for specifying the format of the print document. In the sequence of the present embodiment shown in FIG. 3, a format suitable for pull-type print mode, such as a format of data in which the link path information is described and a format of topPage data described in an XHTML-Print format, is specified as the parameter "image_format_specifier" (FIG. 5).

The second different point is the exchange of data in the phase "object push". In the sequence of the prior art in FIG. 1, when the controller 11 issues the command CAPTURE to the printer unit 13, the HDD unit 12 makes push-type data transfer to the printer unit 13 under the instruction of the controller 11, and then the printer unit 13 returns a response to the command CAPTURE to the controller 11 after receiving the print data.

In the sequence of FIG. 3, the controller 11 issues the command CAPTURE to the printer unit 13, and the push-type data transfer of the print object is first conducted according to the parameters of the command. The printer unit 13 analyzes the contents of the print object, and makes pull-type data transfer if the link path information is described in the print object. That is, the sequence of the present embodiment is different from that of the prior art shown in FIG. 1 in that the pull-type data transfer occurs.

Figure 4:
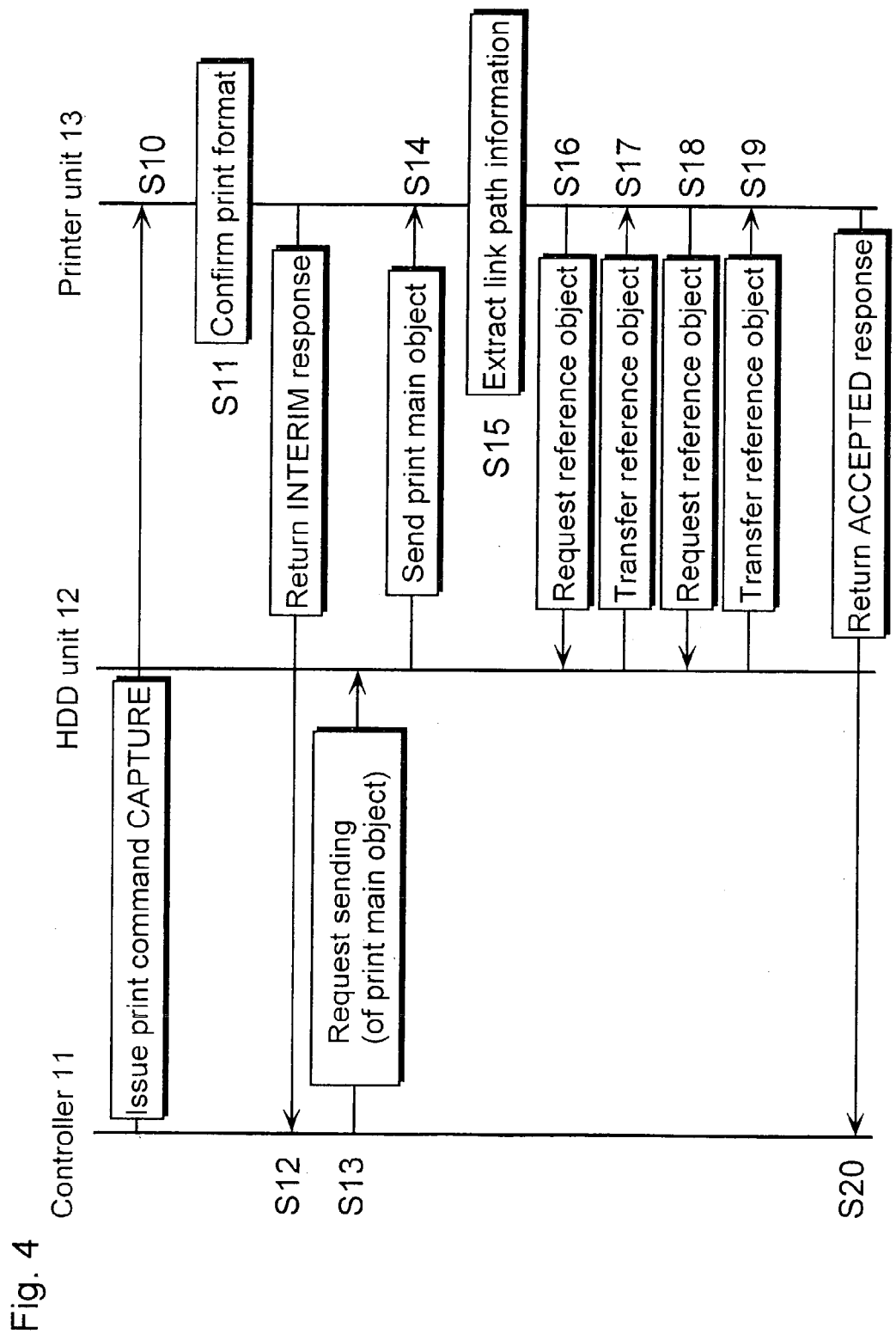
FIG. 4 is a diagram showing the detailed communication sequence of the phase "object push" shown in FIG. 3.

To be more specific, in the phase "object push" in FIG. 3, the communication sequence shown in FIG. 4 is done. For a start, the controller 11 issues the print command CAPTURE to the printer unit 13 (Step S10). At this time, the format suitable for the pull-type print mode is specified as the parameter "image_format_specifier" as mentioned above, and the printer unit 13 understands that the link path information is described in the print main object which will be received later in Step S14 (S11). When receiving the print command CAPTURE, the printer unit 13 returns an INTERIM response (Step S12). Subsequently, the controller 11 requests the HDD unit 12 to send the data in which the link path information is described (print main object) to the printer unit 13 (Sl3). Upon receipt of this request, the HDD unit 12 sends (pushes) the data in which the link path information is described (print main object) to the printer unit 13 via the asynchronous connection which has been already established (Sl4). The printer unit 13 executes print processing of the data in which the link path information is described (print main object), and extracts the link path information during the print processing and then shifts to the pull-type print processing (S15).

The printer unit 13 which has shifted to the pull-type print processing issues a file send request command and so on to the HDD unit 12 to request the HDD unit 12 to send a reference object (such as an image object represented as a reference by hyperlink) which can be uniquely specified using the extracted link path information (S16). Thereby, the reference object is transferred (pulled) from the HDD unit 12 to the printer unit 13 via aforesaid connection (S17).

This transfer sequence of the reference object is repeated (S18 and S19) every time the link path information is extracted. Note that the printer unit 13 may repeat a necessary number of receptions of the reference object, or may repeat a plural number of receptions of the reference object which is divided into receivable size data.

After completing acquisition of all the print objects and coming to the stage where the print processing can be performed without delay, the printer unit 13 returns to the controller 11 an ACCEPTED response to the command CAPTURE (response to Step S10) (S20). In doing this, the execution to the pull-type print command CAPTURE is completed.

The processing in Step S20 may be performed instead of INTERIM response in Step S12. However, in the present embodiment, the ACCEPTED response is returned after the printer unit 13 completes acquisition of all the print objects and comes to the stage where it can continue the print processing even if the print objects stored in the HDD unit 12 are deleted. Therefore, the controller 11 and the HDD unit 12 can recognize the timing of deleting the print objects.

The explanation of the print main object and the reference object will follow. The print main object may be the data in which only the link path information for uniquely specifying the reference object is described, or the print main object itself may be the data which forms a part of the final printing. The reference object is basically the data which forms a part of the final printing, but there may be the case where the link path information to another reference object is further described in the reference object. This reference object is also the data which forms a part of the final printing, and the printer unit 13 performs the same processing in Step S16 and Step S17 if necessary to obtain the reference object and forms the printing.

FIG. 5 is a diagram showing a detailed format of the command CAPTURE which has been already defined by AV/C Printer Subunit. It shows operands (parameters which are added to the command) in the AV/C command frame of the command CAPTURE and the lengths thereof (the number of bytes).

As shown in FIG. 5, the command CAPTURE has a structure that allows to specify the following parameters as operands: a parameter "subfunction" specifying a specific operation, a return parameter "status" and "result", a parameter "destination_plug" specifying an input port for the connection on the printer unit (data reception device; consumer) end, a parameter "print_job_ID" specifying a print job which is subject to the command, a parameter "image_format_specifier" specifying a format of the print main object such as JPEG and GIF, a parameter "data_size" specifying a data size of the print main object to be transferred, a parameter "image_size_x" and "image_size_y" specifying the number of pixels as image data, a parameter "next_pic" and "next_page on the Nin1 print processing. In the present embodiment, the pull-type print processing is realized by specifying a format of the print main object suitable for the pull-type print mode with the parameter "image_format_specifier". An explicit variable value for specifying a format suitable for the pull-type print mode is not defined in aforesaid "TA Document 1999038 AV/C Printer Subunit Specification 1.0", but such a format can be specified by applying an area "Vendor Dependent category" (from "0x8000" through "0x8FFF") where a vendor can specify its own print format. A new value for identifying a format suitable for the pull-type print mode may be determined and standardized, of course.

A format suitable for the pull-type print mode may be any kind of data including the link path information, as mentioned above. For example, it may be XML and HTML which are other tagging languages or a document format such as PDF (Portable Document Format) and Word including the link path information, as well as the data in which the link path information is described and TopPage data described in a HTML-Print format, as described in the present embodiment. Transfer method including a transfer style, a transfer unit and a transfer timing is changed if necessary depending upon each format.

The data in which the link path information is described is not a general print text format but its own format, but it may be simple data which is made up of the link path information only, or data which is made up of the parameters effective to the print processing and the link path information. For example, if it is the data which is made up of the print parameters which cannot be specified in the framework of the existing AV/C Printer Subunit (such as specifying of two-sided printing) and the link path information, more advanced printing becomes possible in the range of the framework of AV/C Printer Subunit. Examples of the print parameters include parameters for specifying two-sided printing, a paper size, a paper type, an image type and so forth which could not be specified without a new command in the framework of AV/C Printer Subunit, or parameters for specifying in more detail the print parameters which can be specified in the existing framework of AV/C Printer Subunit.

Instead of defining how to describe the link path information in the data, it may be described in the data using a tagging language like XML shown in FIG. 15. Note that the link path information is information that uniquely specifies a location of a file as mentioned above, including, for instance, a file path specifying a file location on the local area (such as "c: ¥windows¥regedit.exe") and URL (Uniform Resource Locator) specifying a file location on the network like the Internet (such as http://www.panasonic-.co.jp/products/tv/index.html).

In an HTML file, link path information is described by either an absolute path or a relative path. The absolute path uniquely specifies data location with only the information thereof, while the relative path, which is a description of the path from a reference location to the target data, can uniquely specify the data location by a combination with the reference location. When the pull-type print mode is executed, there is no particular problem if all the link path information is the absolute paths. However, if a part or all of the link path information is the relative paths, the printer unit 13 needs to acquire the reference location of the relative path through some kind of means. How to acquire the reference location of the relative path is not particularly limited, but there is a method of calculating the reference location of the relative path based on the absolute path described in the print main object, for instance. When the link path information described in the print main object is an absolute path "http://www.panasonic.co.jp/products/tv/index.html" (A) and a relative path "Images/Q4_plug.gif" (B) is detected in the following processing, the final file path information is (A_(print object name)+B) and determined to be "http://www.panasonic.co.jp/products/tv/Images/Q4_plug.gif". In addition, there is a method by which the creator of the print main object or the controller 11 specifies the reference location of the relative path explicitly in the print main object, using "Base" element which is an element for specifying the reference location of the relative path in the tagging language such as HTML and XHTML-Print. In FIG. 15 which is an example of data in which link path information is described, the reference location of the relative path is explicitly specified using a "relative path reference location" tag. A method may be used, of course, by which the controller 11 notifies the printer unite 13 of the reference location of the relative path separately, by applying another command or using a new command.

Or, format information of data which is uniquely specified with the link path information may be described in the data in which the link path information is described. Thereby, the printer unit 13 can determine what the data to be printed in the pull-type print mode is, and therefore can execute pull-printing of the print data in various formats in the printing system of the present embodiment.

For example, in FIG. 15 which is an example of data in which link path information is described, a "format" tag is provided, which explicitly specifies a format type of the data which is uniquely specified with a "URL" tag. Therefore, it becomes possible to execute pull-printing of not only the data in a predefined format such as XHTML-Print but also the image data such as JPEG and PNG and the data in a newly defined format. The controller 11 may separately notify the printer unit 13 of the format information of the data which is uniquely specified with the link path information using a command applying another command or a new command, or the printer device which is equipped with a receive data format analysis function may detect the format of the print object by itself. Or, Vendor Dependent category may be used, in addition to a method of appending the format information to the link path information. The link path information may be defined one by one, in such a manner that "0x8001" is the link path information for pull-printing in the XHTML-Print format and "0x8002" is for pull-printing in the JPEG format.

In Step S16 through Step S19 in FIG. 4, the printer unit 13 shifts to the pull-type printing procedure, and requests the HDD unit 12 to send the reference object (issue a send command) in order to receive the reference object which is uniquely specified with the link path information. Various types of attribute information (send command issuance parameters) of the HDD unit 12 are necessary for issuing the send command to the HDD unit 12.

Examples of the send command issuance parameters include address information of the HDD unit 12, type information of the HDD unit 12 and connection information. The address information is necessary for specifying the address of the send command, and the type information is necessary for identifying the type of the device when the system, order and so on of the command on sending and receiving of information depend on the differences in the characteristic and version of the device. The connection information is necessary for determining from which connection the HDD unit 12 sends data. Above-mentioned send command issuance parameters are just examples, other parameters may be used.

The examples of above-mentioned send command issuance parameters correspond to "producer_node_ID", "producer_EUI_64", "source_plug", "subunit_type", "subunit_ID" and so forth, according to the IEEE1394 standard. The parameter "producer_node_ID" is an operand specifying a location of the print object to be pulled, that is, a data supply device (producer) such as an HDD unit. The parameter "producer_EUI_64" is an operand which corresponds to a unique product number of the data supply device (producer) such as the HDD unit. It is possible to obtain the parameter "producer_node_ID" of the data supply device (producer) by searching for a device having the same value as that of the parameter "producer_EUI_64". The parameter "source_plug" is an operand specifying an output port on the data supply device (producer) end in the connection. Here, when the controller that issues this print command doubles with the data supply device (producer) (holds the print object), it can print its own print object by setting the value of the parameter "producer_node_ID" or "producer_EUI_64" to be the value of itself. Also, the parameters "subunit_type" and "subunit_ID" are operands specifying the type of the data supply device (producer) (such as DSC (Digital Still Camera), STB, DTV (Digital TV), HDD) and the device number thereof. The type of the data supply device identifies the type thereof when the system, order and so on of the command on sending and receiving of information depend on the differences in the characteristic and version of the device.

Conventionally, as an approach for the printer unit 13 to acquire the send command issuance parameters, feature expansion by adding a new AV/C command to the existing AV/C Printer Subunit has been studied. However, such an approach causes the well-known protocol to be modified, which confuses engineers in the area of IEEE1394. That is a problem. Therefore, in order to avoid this problem, the controller 11 inquires the status of the established connection so that the printer unit 13 obtains the send command issuance parameters, according to the present invention. There is a means for inquiring the connection status using the existing connection management command AC (Asynchronous Connection) MANAGE STATUS command, for instance. The details of the AC MANAGE STATUS command are described in "TA Document 1999037 AV/C Command for Management of Enhanced Asynchronous Serial Bus Connections 1.0" which is available at "http://www.1394TA.org". FIG. 16 shows the detailed command format of the AC MANAGE STATUS command and the contents of the response. The information of "subunit_type", "subunit ID" and "subunit_plug" described in FIG. 16 is used as the send command issuance parameter.

As for the framework where the HDD unit 12 receives the send command and sends the print main object and the reference object to the printer unit 13 in Step S13 through Step S14 and Step S16 through Step S19 in FIG. 4, the existing framework for sending and receiving data, AV/C Camera Storage Subunit may be applied, for example. As a specific procedure, the controller 11 or the printer unit 13 may issue the SEND FILE command of AV/C Camera Storage Subunit to the HDD unit 12. Particularly for split sending and receiving data, it may issue the SEND FILE PARTIAL command of AV/C Camera Storage Subunit 2.0. In order to issue these commands, the parameters "producer_node_ID", "subunit_type" and "subunit_ID" are necessary for specifying the addresses of the commands, and the parameter "source_plug" is necessary as an argument to the commands. The printer unit 13 inquires the connection status, as mentioned above, so as to obtain these parameters. More specifically, the printer unit 13 first inquires the status of AC internally and obtains "Node_ID" (=Producer_node_ID) and "Unit_Plug" of the HDD unit 12 to which the printer unit 13 is connected via the AC. Next, the printer unit 13 issues the AC MANAGE STATUS command to the HDD unit 12 using the obtained "Unit_Plug" and obtains "subunit_type", "subunit_ID" and "subunit_plug (=Source_Plug).

The printer unit may capture the reference object file from the HDD unit using the command of other data send and receive Subunit and the command GET in HTTP (Hyper Text Transfer Protocol), for instance, in addition to the framework of AC/C Camera Storage Subunit. What kind of data send framework the HDD unit 12 has can be determined based on the parameter "subunit_type", and it can be obtained by inquiring the connection status, as mentioned above.

On resetting a bus, after restoring the connection by issuing the AC MANAGE command specifying the parameter RESTORE_PORT subfunction, the controller 11 may issue the command CAPTURE specifying the parameter RESUME subfunction. Thereby, the printer unit 13 can capture the print object using the above-mentioned command SEND FILE PARTIAL and so on and resume print operation.

In order to attain security of print processing and copyright protection of a print object, access to the print object on the HDD unit 12 needs to be limited only to the printer unit selected as a unit for printing by the user or the controller 11. That purpose can be achieved by the following three methods.

The first method is to conceal a subunit which is a data supplier so that an ordinary search device cannot find it. According to the IEEE1394 standard, SUBUNIT INFO command that is an AV/C GENERAL command is usually sent to a device, lists of "Subunit_type" and "Subunit_ID" are obtained as a response to the command, and which subunit the device owns is confirmed. Therefore, if the HDD unit 12 does not respond that it owns the subunit which is a supplier of print objects (such as Camera Storage Subunit) when receiving the SUBUNIT INFO command, it can be concealed that the HDD unit 12 is a supplier of print objects. The controller 11 inquires the established connection status, and thereby, the printer unit 13 can obtain "subunit_type" and "subunit_ID" of the camera storage subunit 12a in the HDD unit 12, as mentioned above.

The second method is to limit the AV/C command acceptance by the camera storage subunit 12a in the HDD unit 12 to a device pre-specified by the controller 11 and others. For example, the controller 11 notifies the HDD unit 12 of the identifier of the printer unit 13 in advance. The camera storage subunit 12a in the HDD unit 12 accepts the AV/C command only from the printer unit 13 is which has the notified identifier, and performs processing. Under the mechanism, only the printer unit selected by the user as a unit for printing can access the print object on the HDD unit 12. Note that the identifiers include "Node_ID" and "EUI_64".

The third method is to provide a print object supply function by a command addressed to UNIT by equipping the HDD unit 12 itself, not a subunit, with that function. In order to realize the command addressed to UNIT, there is a method of realizing access to the print object by applying Vendor-Dependent UNIT command. Using this method, access to the print object can be limited to the printer unit which can issue the Vendor-Dependent UNIT command.

When a subunit having a print data supply function defined by IEEE1394TA is used, a method may be used that no other function than that required for the pull-type print mode is processed even if it is a mandatory command. For example, when the print data supply function is realized by Camera Storage Subunit, the file structure of the print data supply device can be concealed by equipping with only SEND FILE PARTIAL command, not equipping with other FILE LIST command and others.

FIG. 6~FIG. 14 are detailed flowcharts of the communication sequence shown in FIG. 3 that show exchanges of commands between three devices, the controller 11, the HDD unit 12 and the printer unit 13. Here, the controller 11 is realized as one of the functions of the STB unit 14. Arrows indicate the issuance of the commands, and in the boxes above or near the arrows, the step numbers (①② . . . ) and the processing contents are indicated on the upper line and the protocol to which the command belongs (left) and the command type (right) are indicated on the lower line. In these figures, "PS" represents "Printer Subunit", "AC" represents "Asynchronous Connection", "1394" represents an IEEE1394 transaction in the IEEE1394 standard, "FCP" represents "Function Control Protocol, IEC61883: Digital Interface for Consumer Electric Audio/Video Equipment" that is a protocol used as a standard for AV/C commands and the responses to them.

Figure 6:
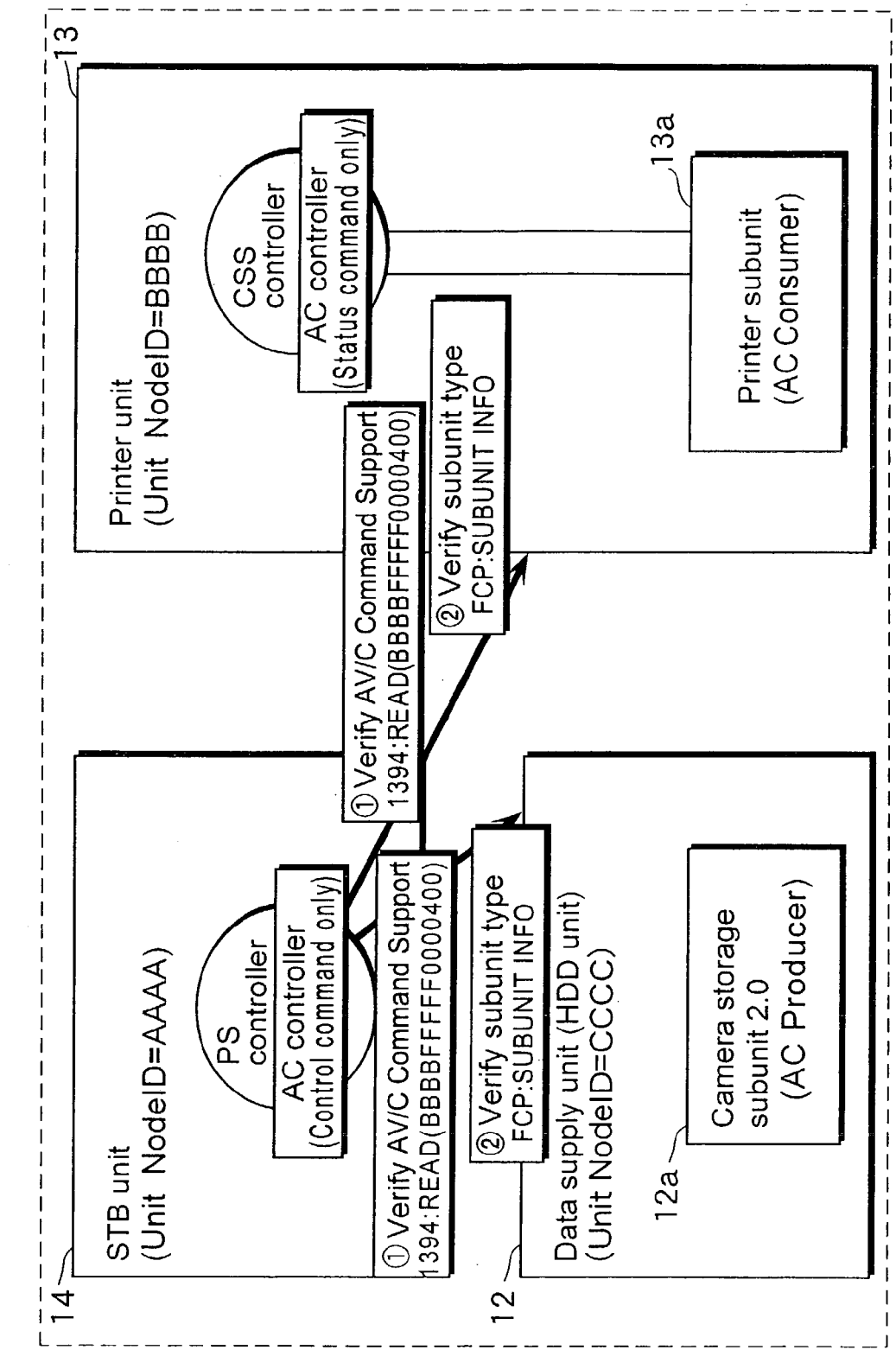
FIG. 6 is one of the detailed flowcharts of the communication sequence (device verification phase) in the printing system shown in FIG. 2.

When the STB unit 14 receives a print request from a user via an arbitrary application on the STB unit 14, the controller 11 first inquires the device information of the HDD unit 12 and the printer unit 13 in order to verify whether they support AV/C Protocol or not, as a controller for a printer subunit (PS Controller) and a controller for establishing a connection (AC Controller) (Step 1), and then inquires the subunit information of the HDD unit 12 and the printer unit 13 (Step 2), as shown in FIG. 6. Here, the HDD unit 12 and the printer unit 13 respectively respond that they hold Camera Storage Subunit and Printer Subunit.

Figure 7:
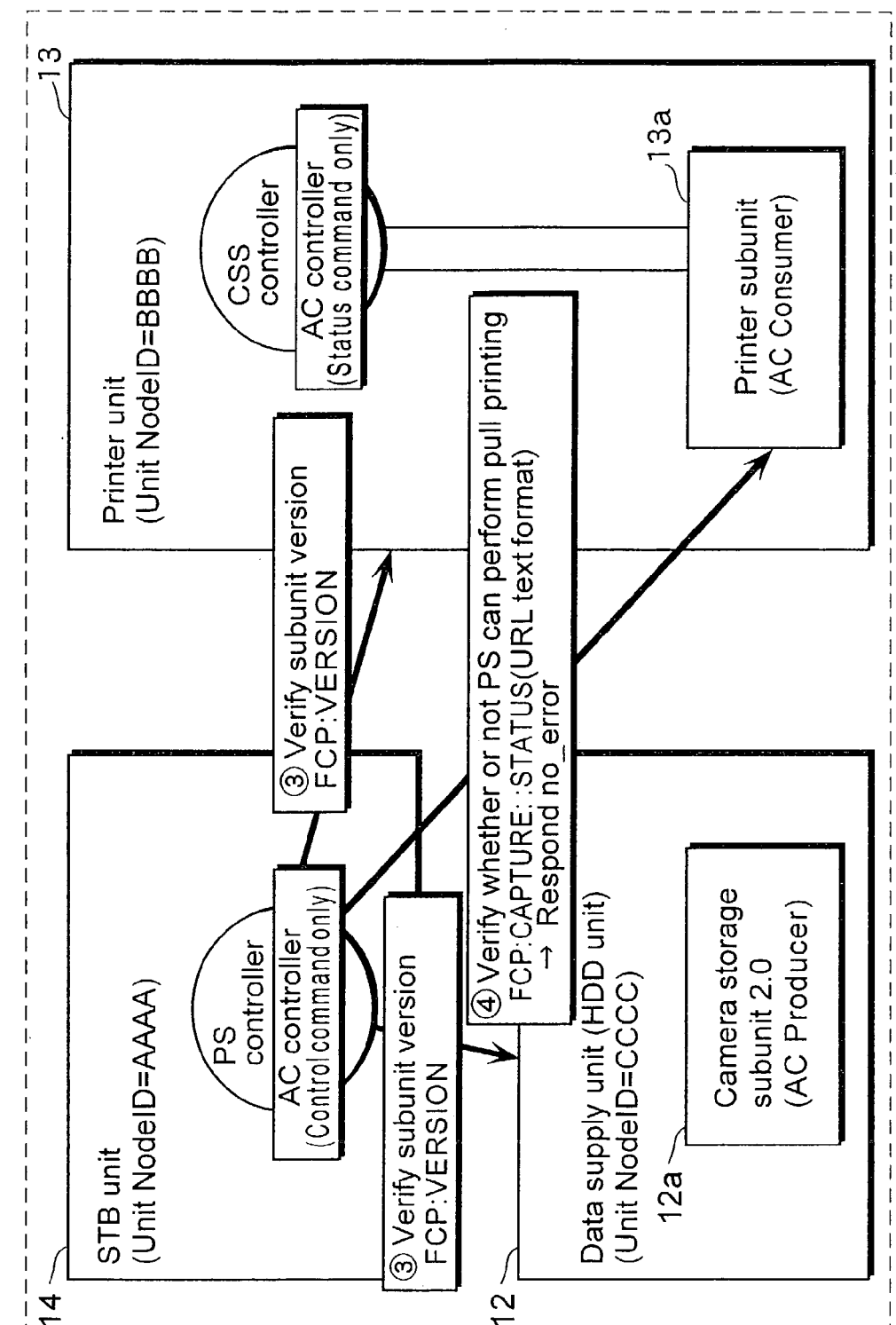
FIG. 7 is one of the detailed flowcharts of the communication sequence (version verification phase) in the printing system shown in FIG. 2.

Next, as shown in FIG. 7, the controller 11 verifies the subunit version by issuing a VERSION command to the HDD unit 12 and the printer unit 13, respectively (Step 3). Here, they respond that their versions are Camera Storage Subunit Version 2.0 and Printer Subunit Version 1.0, respectively. Then, the controller 11 inquires of the printer unit 13 about whether or not it supports a format suitable for the pull-type print mode by issuing a CAPTURE STATUS command to the printer unit 13. That is, the controller 11 verifies whether it supports the pull-type printing procedure (Pull Print) or not (Step 4). Here, the controller 11 inquires about whether or not the printer unit 13 supports the text data in which URL is described as shown in FIG. 15 (URL text data) that is the data in which link path information is described, for example.

Figure 8:
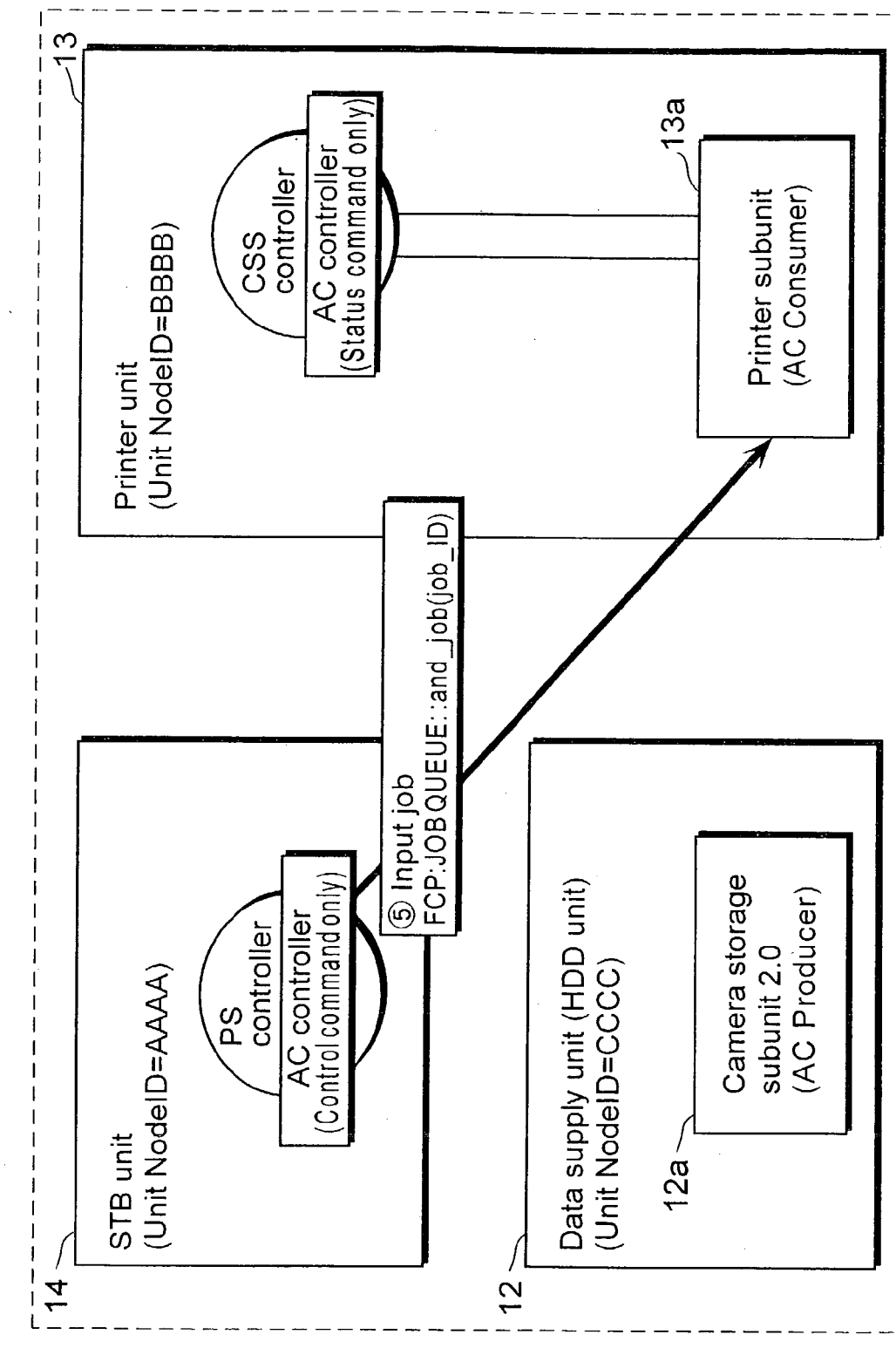
FIG. 8 is one of the detailed flowcharts of the communication sequence (job creation phase) in the printing system shown in FIG. 2.

Next, as shown in FIG. 8, the controller 11 issues "add_job" subfunction of JOB QUEUE command to the printer unit 13 and inputs a print job (Step 5).

Figure 9:
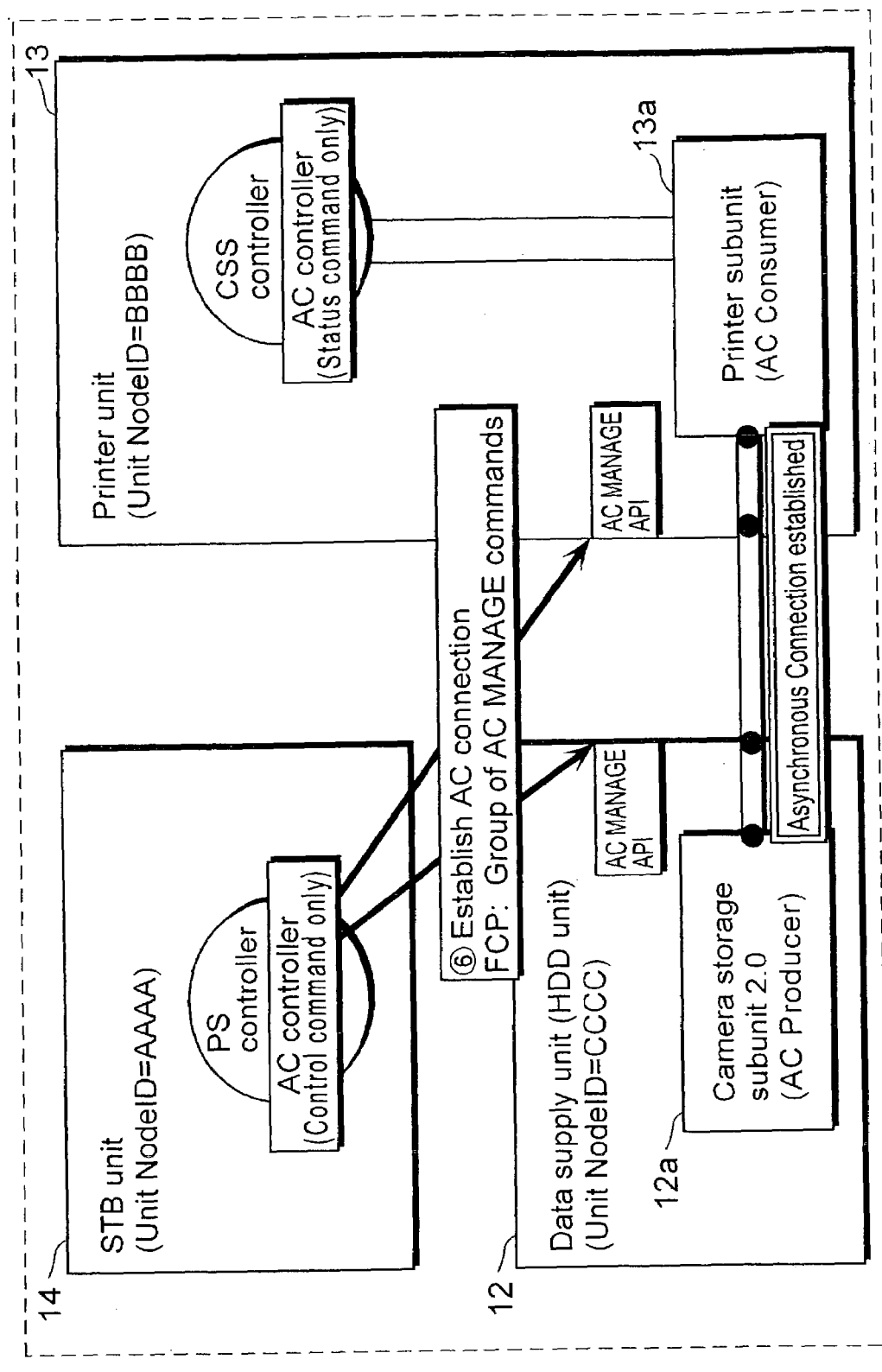
FIG. 9 is one of the detailed flowcharts of the communication sequence (connection establishment phase) in the printing system shown in FIG. 2.

Next, as shown in FIG. 9, the controller 11 issues a group of AC MANAGE commands (subfunction ALLOCATE, ALLOCATE_ATTACH, and ATTACH) and establishes a connection between the HDD unit 12 and the printer unit 13 (Step 6).

Figure 10:
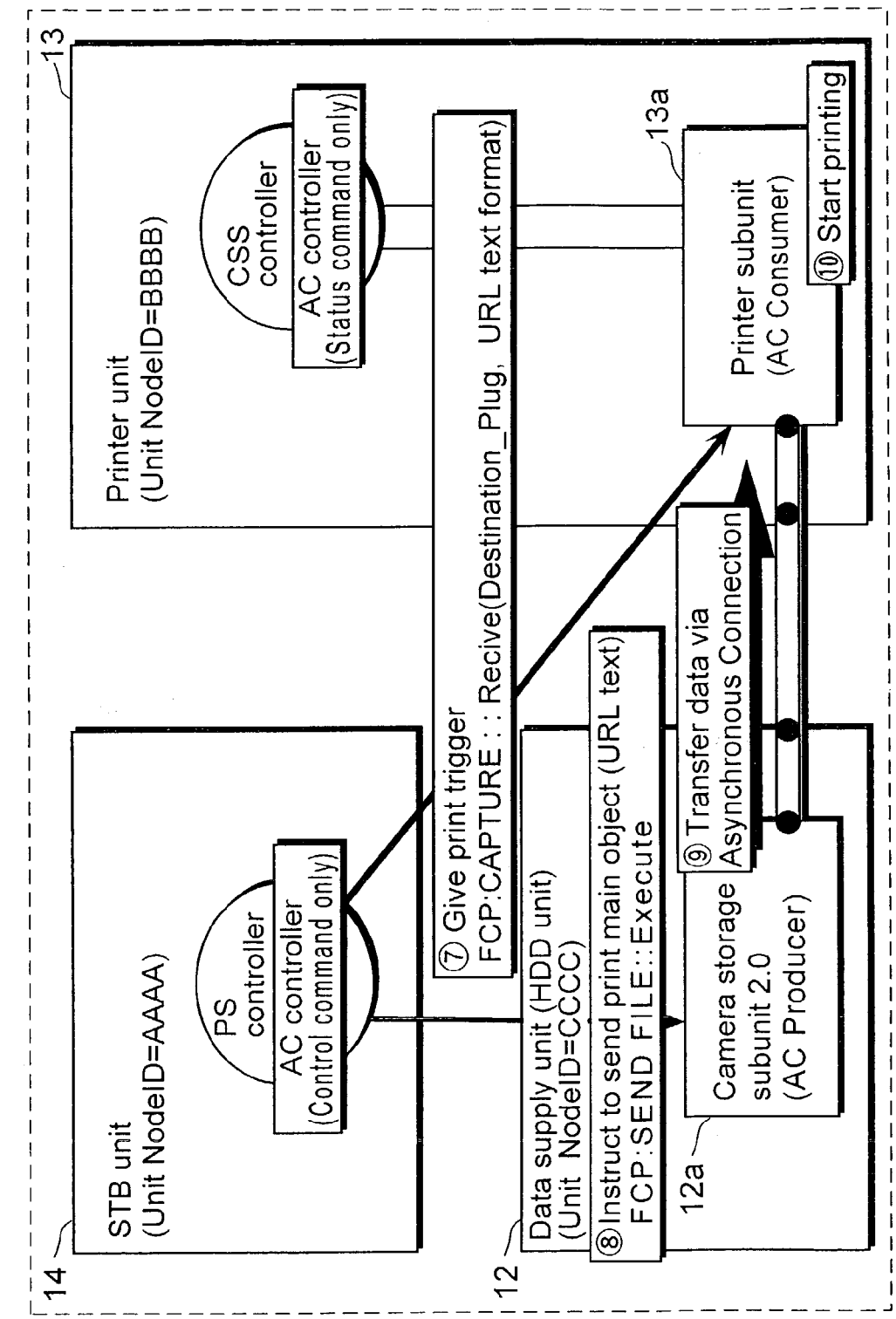
FIG. 10 is one of the detailed flowcharts of the communication sequence (print instruction phase) in the printing system shown in FIG. 2.

Next, as shown in FIG. 10, the controller 11 issues a print command CAPTURE to the printer unit 13 and gives the printer unit 13 a trigger for printing (Step 7). Then, the controller 11 issues Camera Storage Subunit command SEND FILE to the HDD unit 12, and instructs the HDD unit 12 to send URL text data in which URL of the unit for printing (link path information) shown in FIG. 15 as a print main object to the printer unit 13 (Step 8).

Here, the URL text data is used as data suitable for the pull-type print mode in which the link path information is described. However, this is just an example, and any other data suitable for the pull-type print mode supported by the printer unit 13 (which is verified in the above-mentioned processing in Step 4) may be used.

In the present embodiment, the above-mentioned URL text data has been explained on the assumption that it has been recorded in the HDD unit 12 together with other print objects before the print request from the user. When the URL text data is created or modified by the STB unit 14 in response to every print request from the user, an additional step of creating and modifying the URL text data is required before Step 8. Furthermore, when the STB unit 14 including the controller 11 and the HDD unit 12 are separate devices which are connected to each other via a transmission channel, a step of transferring the URL text data created and modified by the STB unit 14 to the HDD unit 12 is required before Step 8.

When receiving this command, the HDD unit 12 transfers the URL text data to the printer unit 13 using the established connection (Asynchronous Connection) (Step 9). When receiving the URL text data, the printer unit 13 starts print processing (Step 10).

Figure 11:
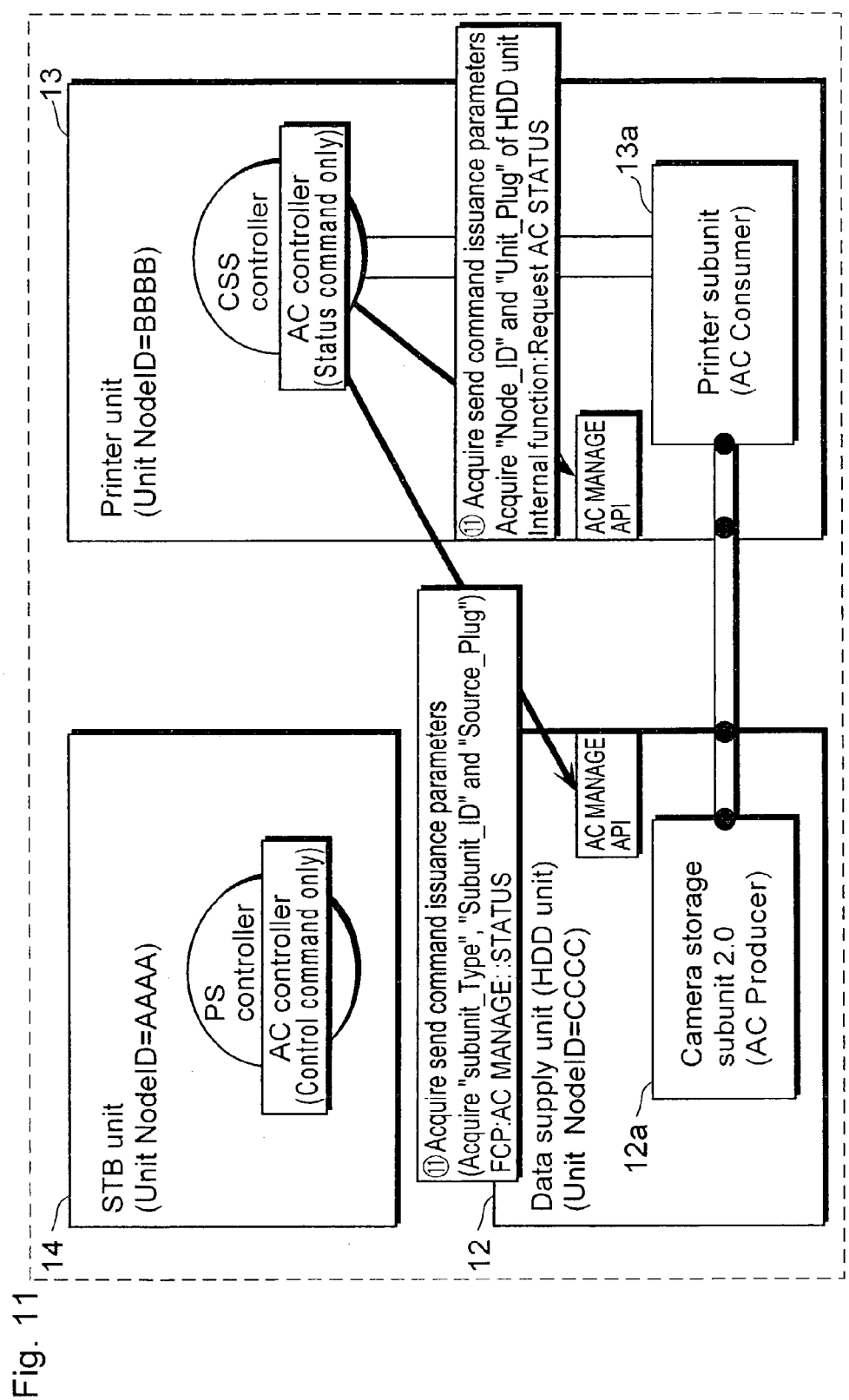
FIG. 11 is one of the detailed flowcharts of the communication sequence (send command issuance parameter acquisition phase) in the printing system shown in FIG. 2.

When starting the print processing in Step 10, the printer unit 13 starts analyzing the URL text data and performs processing of generating print image data. When the printer unit 13 needs the data which is uniquely specified with the link path information described in the URL text data and located on the HDD unit 12 during generating the image data, it performs processing of acquiring send command issuance parameters (Step 11) as shown in FIG. 11. Specifically speaking, as described above, the printer unit 13 first inquires the status of the established AC internally and acquires "Node_ID" (=Producer_node_ID) and "Unit_Plug" of the HDD unit 12. Next, the printer unit 13 issues AC MANAGE STATUS command shown in FIG. 16 to the HDD unit 12 using the acquired "Unit_Plug" and acquires "subunit_type", "subunit_ID" and "subunit_plug" (=Source_Plug) of the camera storage subunit 12a in the HDD unit 12.

The printer unit 13 acquires the send command issuance parameters according to the above-mentioned processing. The contents and usages of the parameters have been shown in the above description.

Figure 12:
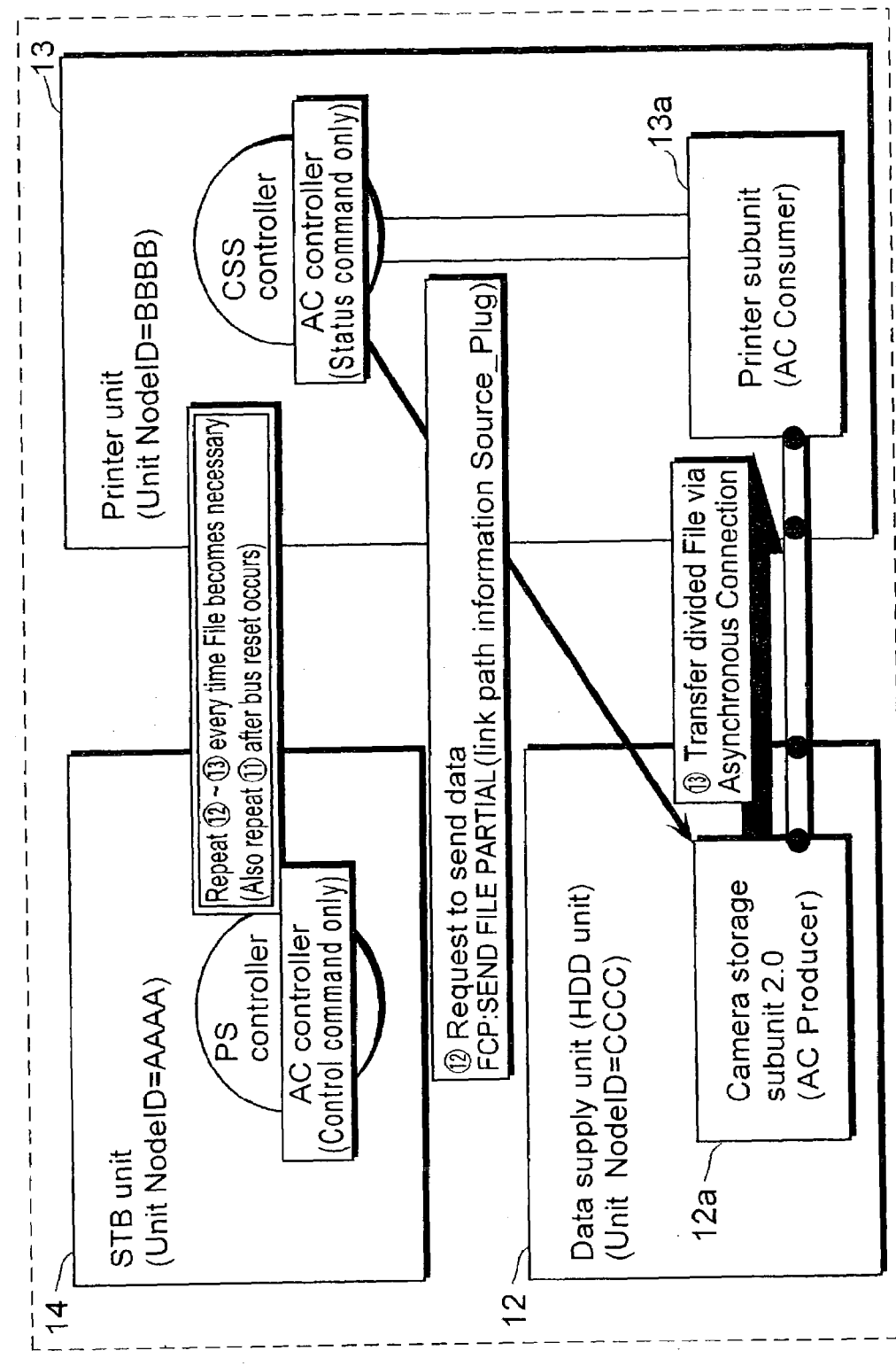
FIG. 12 is one of the detailed flowcharts of the communication sequence (print data transfer phase) in the printing system shown in FIG. 2.

Next, as shown in FIG. 12, the printer unit 13 issues Camera Storage Subunit command SEND FILE or SEND FILE PARTIAL to the HDD unit 12 using the send command issuance parameters obtained in Step 1 and the link path information of the necessary data, and requests the HDD unit 12 to send the data (Step 12). Thereby, the printer unit 13 captures the necessary data from the HDD unit 12 via the connection established in Step 6 and continues the processing of generating image data (Step 13). During generating the image data, the printer unit 13 extracts the link path information and repeats the processing from Step 12 through Step 13 every time that data becomes necessary. When the send command issuance parameter changes during the steps up to Step 13, such as occurrence of bus reset in EIII1394, (the parameter "Producer_Node_ID" changes when the bus reset occurs), the printer unit 13 re-executes Step 11 and updates the send command issuance parameters. It updates the send command issuance parameters after the controller 11 restores the connection between the HDD unit 12 and the printer unit 13 and the printer unit 13 receives the command CAPTURE specifying the parameter RESUME subfunction from the controller 11.

Figure 13:
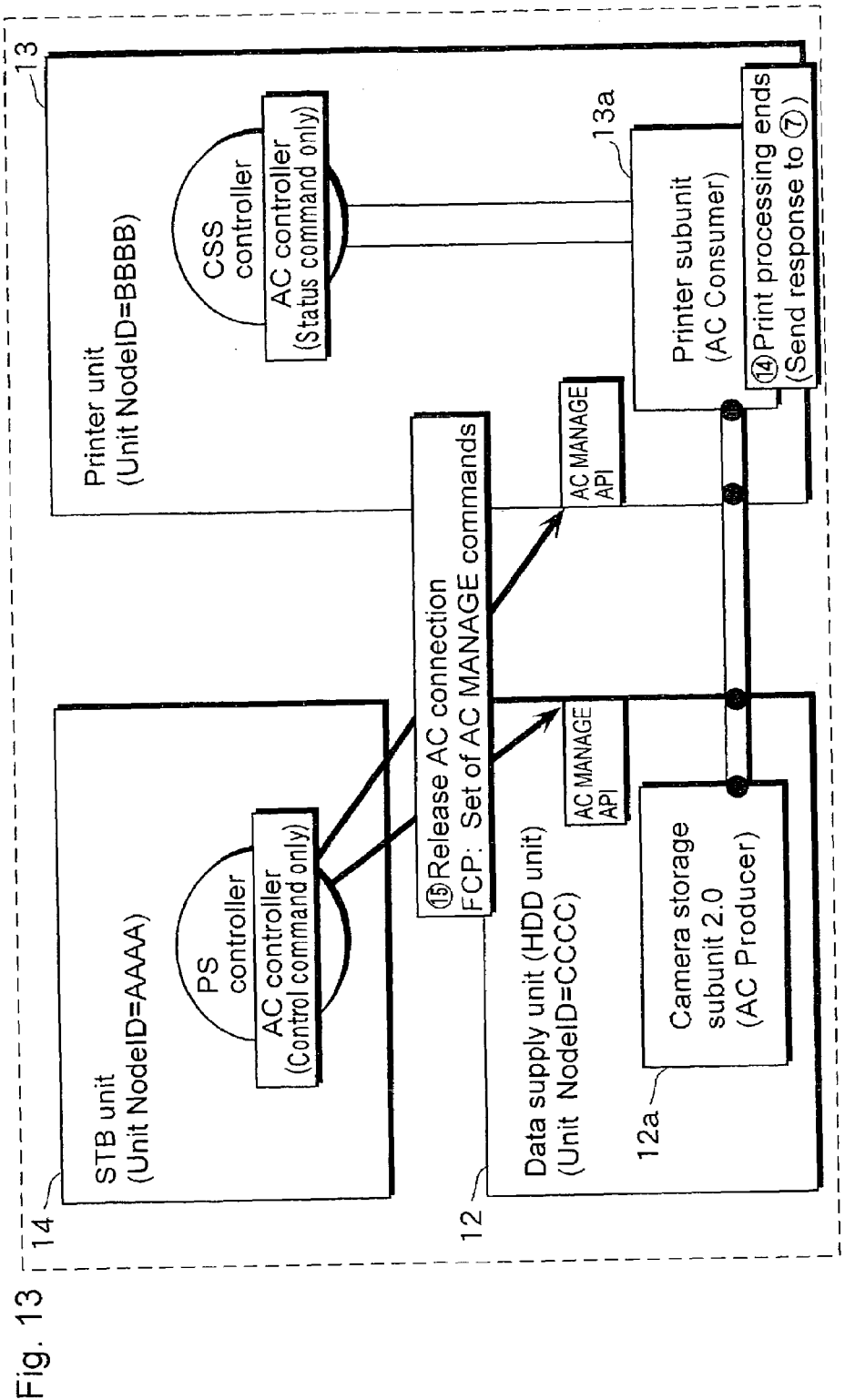
FIG. 13 is one of the detailed flowcharts of the communication sequence (disconnection phase) in the printing system shown in FIG. 2.

Next, as shown in FIG. 13, after completing generating the image data or print processing (Step 14), the printer unit 13 returns a notice of completion to the controller 11 in response to the printing trigger in Step 7. Upon receipt of the notice, the controller 11 releases the connection between the HDD unit 12 and the printer unit 13 (Step 15).

Figure 14:
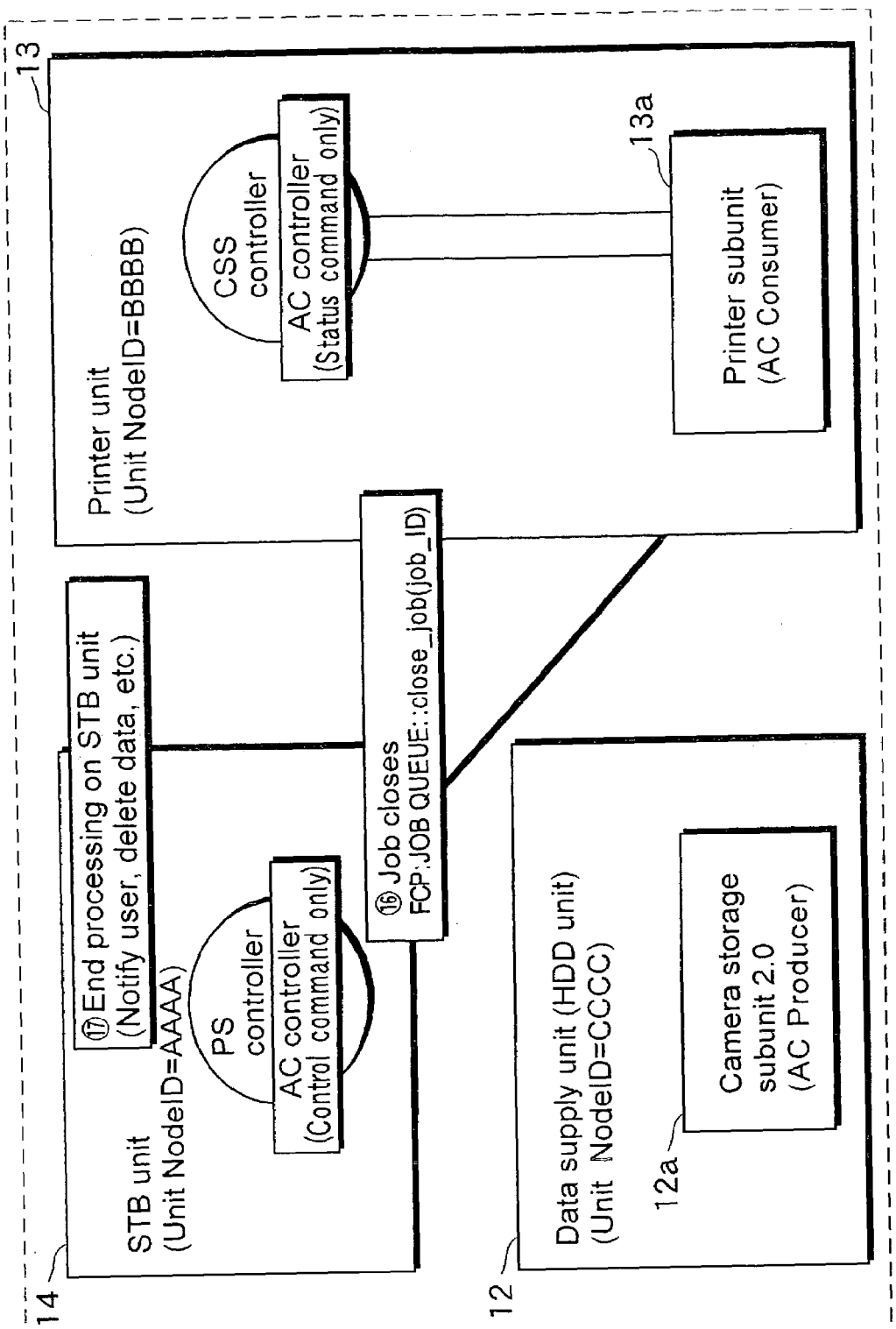
FIG. 14 is one of the detailed flowcharts of the communication sequence (job closure phase) in the printing system shown in FIG. 2.

Next, as shown in FIG. 14, the controller 11 issues a JOB QUEUE command "close_job" subfunction to the printer unit 13 and notifies it of the closure of print job (Step 16).

After completing the above-mentioned processing, the STB unit 14 performs end processing on the STB end if necessary (Step 17). For example, the STB unit 14 notifies the user of the completion of printing or deletes unnecessary print objects.

The printing system according to the present invention has been described based on the present embodiment, but the present invention is not limited to the present embodiment.

For example, STB, an HDD device and a printer device are described as actual examples of the controller, the data supply device (producer) and the data reception device (consumer) which are included in the printing system in the present embodiment. However, in addition to the above devices, the controller may be a computer device, a home bus controller or the like, the data supply device may be a data supply device such as DSC, DTV, DVD (Digital Versatile Disk) devices and a video camera device, and the data reception device may be a mass storage device for storing print objects, a communication device for transferring the print objects to remote locations or the like.

Furthermore, the printing system according to the present embodiment includes devices which are connected to each other via the IEEE1394 bus, but a transmission channel for connecting the devices are not limited to this bus. If it is possible to send and receive print commands, file acquisition commands and others, the print procedure according to the present invention can be applied to the communication system having the LAN (such as 10BaseT) protocol and the Internet protocol on the lower layers.

What is claimed is:

1. A method for transferring print data from a print data supply device to a printer which is connected to the print data supply device via a transmission channel, the method comprising:
a print request step for requesting the printer to print the print data held by the print data supply device;
a print data request step in which the printer acquires attribute information of the print data supply device in response to the print request and requests the print data supply device to send the print data based on the attribute information; and
a print data sending step in which the print data supply device sends the print data to the printer in response to the print data request.

2. The method according to claim 1,
wherein the print data request step includes a link file receiving step for receiving a link file in which link path information to data to be printed is described,
in the print data request step, the print data supply device is requested to send the print data specified with the link path information described in the received link file.

3. The method according to claim 2,
wherein reference location information as a reference for specifying a relative location of the print data is attached to the link file, and
in the print data request step, the print data supply device is requested to send the print data based on the reference location information.

4. The method according to claim 2,
wherein a parameter for print processing is attached to the link file, and
after the print data request step, the printer prints the print data based on the parameter for print processing.

5. The method according to claim 2,
wherein format type information of the data to be printed is attached to the link file, and
after the print data request step, the printer prints the print data based on the format type information.

6. The method according to claim 1,
wherein the printer and the print data supply device repeat the print data request step and the print data sending step.

7. The method according to claim 1,
wherein the print data sending step is executed via a pre-established connection.

8. The method according to claim 7,
wherein the attribute information is acquired by inquiring status of the pre-established connection.

9. The method according to claim 8 further comprising an attribute information updating step for updating the attribute information by re-inquiring the status of the pre-established connection when an address on the transmission channel is reset,
wherein in the print data request step, the print data supply device is re-requested to send the print data based on the updated attribute information.

10. The method according to claim 1,
wherein the attribute information is address information for specifying the print data supply device.

11. The method according to claim 10,
wherein the address information is either one of Node_ID and EUI_64 in IEEE1394 AV/C Standard.

12. The method according to claim 10,
wherein the address information is a combination between said either one of Node_ID and EUI_64 in IEEE1394 AV/C Standard and Subunit_type and Subunit_ID in IEEE1394 AV/C Standard.

13. The method according to claim 1,
wherein the attribute information is type information which specifies a type of the print data supply device.

14. The method according to claim 13,
wherein the type information is Subunit_Type in IEEE1394 AV/C Standard.

15. The method according to claim 1,
wherein the printer receives the print request from a print control device which is different from the print data supply device.

16. The method according to claim 1,
wherein the printer sends a completion notice in response to the print request after completing reception of data necessary for the requested printing.

17. The method according to claim 1 further comprising a connection restoring step for restoring the connection between the print data supply device and the printer when an address on the transmission channel is reset, wherein in the print request step, the print request is resent to the printer, and then, the printer resumes the print data request step and the print data sending step for receiving data necessary for the requested printing via the restored connection.

18. The method according to claim 17, wherein the resent print request is based on the new address.

19. The method according to claim 17, wherein the print data request step and the print data sending step are resumed, after the connection is restored between the print data supply device and the printer and then the print control device completes resending the print request to the printer, based on the attribute information updated by inquiring status of the restored connection.

20. The method according to claim 1, wherein in the print request step, a format of the print data held by the print data supply device is specified, and said method depending on the specified format of the print data is activated.

21. The method according to claim 20, wherein the print data format is either one of a data format including link path information and a tagging data format including the link path information.

22. The method according to claim 21, wherein the tagging data format in which the link path information is described is any one of an HTML format, an XML format, an XHTML format and an XHTML-Print format.

23. The method according to claim 20, wherein in the print request step, a first print data transfer method is used when a first print data format is specified, and a second print data transfer method is used when a second print data format is specified.

24. The method according to claim 1, wherein the print data supply device does not notify a device other than a predetermined device that the print data supply device has a print data supply capability, in response to an inquiry from the other device.

25. The method according to claim 1, wherein the print data supply device normally handles only a request from a device having a predetermined identifier.

26. The method according to claim 1, wherein the print data supply device provides a print data supply function using a command addressed to UNIT.

27. A printing system comprising a print data supply device and a printer which are connected via a transmission channel, wherein the print data supply device holds print data, and the printer includes:

a print request receiving unit operable to receive a print request for having the printer print the print data held by the print data supply device;

a print data request unit operable to acquire attribute information of the print data supply device in response to the print request, and request the print data supply device to send the print data based on the attribute information;

a print data receiving unit operable to receive the print data sent from the print data supply device in response to the print data request; and a printing unit operable to print the print data.

28. The printing system according to claim 27, wherein the printer includes a link file receiving unit operable to receive a link file in which link path information to data to be printed is described, and the print data request unit requests the print data supply device to send the print data specified with the link path information described in the received link file.

29. The printing system according to claim 27, wherein the printer receives the print data sent from the print data supply device via a pre-established connection.

30. The printing system according to claim 29, wherein the printer acquires the attribute information by inquiring status of the pre-established connection.

31. The printing system according to claim 29, wherein the printer further includes an attribute information updating unit operable to update the attribute information by re-inquiring the status of the pre-established connection when an address on the transmission channel is reset, and the print data request unit re-requests the print data supply device to send the print data based on the updated attribute information.

32. The printing system according to claim 27, wherein the attribute information is address information for specifying the print data supply device.

33. The printing system according to claim 27, wherein the attribute information is type information which specifies a type of the print data supply device.

34. The printing system according to claim 27, wherein the printer receives the print request from a print control device which is different from the print data supply device.

35. The printing system according to claim 27, wherein the printer sends a completion notice in response to the print request after completing reception of data necessary for the requested printing.

36. The printing system according to claim 27 further comprising a connection restoring unit operable to restore the connection between the print data supply device and the printer when an address on the transmission channel is reset, wherein the print request receiving unit re-receives the print request to the printer, and then, the printer resumes reception of the print data which is necessary for the requested printing, the reception being performed by the print data request unit and the print data receiving unit.

37. The printing system according to claim 36, wherein the print data request unit and the print data receiving unit resume reception of the print data, after the connection restoring unit completes restoring the connection between the print data supply device and the printer and then the print request receiving unit completes re-reception of the print request to the printer, based on the attribute information updated by inquiring status of the restored connection.

38. A printer which is connected to a print data supply device which holds print data via a transmission channel, the printer comprising:

a print request receiving unit operable to receive a print request for having the printer print the print data held by the print data supply device;

a print data request unit operable to acquire attribute information of the print data supply device in response to the print request, and request the print data supply device to send the print data based on the attribute information;

a print data receiving unit operable to receive the print data sent from the print data supply device in response to the print data request; and a printing unit operable to print the print data.

39. The printer according to claim 38, wherein the print data receiving unit includes a link file receiving unit operable to receive a link file in which link path information to data to be printed is described, and the print data request unit requests the print data supply device to send the print data specified with the link path information described in the received link file.

40. The printer according to claim 38, wherein the print data receiving unit receives the print data sent from the print data supply device via a pre-established connection.

41. The printer according to claim 40, wherein the print data request unit acquires the attribute information by inquiring status of the pre-established connection.

42. The printer according to claim 40, wherein the print data request unit updates the attribute information by re-inquiring the status of the pre-established connection when an address on the transmission channel is reset, and re-requests the print data supply device to send the print data based on the updated attribute information.

43. The printer according to claim 38, wherein the attribute information is address information for specifying the print data supply device.

44. The printer according to claim 38, wherein the attribute information is type information which specifies a type of the print data supply device.

45. The printer according to claim 38, wherein the print request receiving unit receives the print request from a print control device which is different from the print data supply device.

46. The printer according to claim 38, wherein the print data receiving unit sends a completion notice in response to the print request after completing reception of data necessary for the requested printing.

47. The printer according to claim 38, wherein when an address on the transmission channel is reset, the print request receiving unit re-receives the print request after the connection with the print data supply device is restored, and then, the print data request unit and the print data receiving unit resume reception of the print data which is necessary for the requested printing.

48. The printer according to claim 47, wherein the print data request unit and the print data receiving unit resume reception of the print data, after the connection is restored with the print data supply device and the print request receiving unit completes re-reception of the print request, based on the attribute information updated by inquiring status of the restored connection.

49. A computer-readable medium storing a program for a printer for forming an image based on print data received from a print data supply device via a transmission channel, the program causing the printer to function as:

a print request receiving unit operable to receive a print request for having the printer print the print data held by the print data supply device;

a print data request unit operable to acquire attribute information of the print data supply device in response to the print request, and request the print data supply device to send the print data based on the attribute information;

a print data receiving unit operable to receive the print data sent from the print data supply device in response to the print data request; and a printing unit operable to print the print data.

* * * * *

UNITED STATES PATENT AND TRADEMARK OFFICE
CERTIFICATE OF CORRECTION

PATENT NO. : 7,193,740 B2 Page 1 of 1
APPLICATION NO. : 10/345928
DATED : March 20, 2007
INVENTOR(S) : Shigeki Matsunaga et al.

It is certified that error appears in the above-identified patent and that said Letters Patent is hereby corrected as shown below:

On the title page item (73) "Assignee":

"Matushita" should read --Matsushita--.

Signed and Sealed this

Twenty-fourth Day of July, 2007

JON W. DUDAS
*Director of the United States Patent and Trademark Office*